Jan. 16, 1923.
R. J. WENSLEY.
ELECTRICAL SYSTEM.
FILED MAR. 14, 1918.
1,442,202.
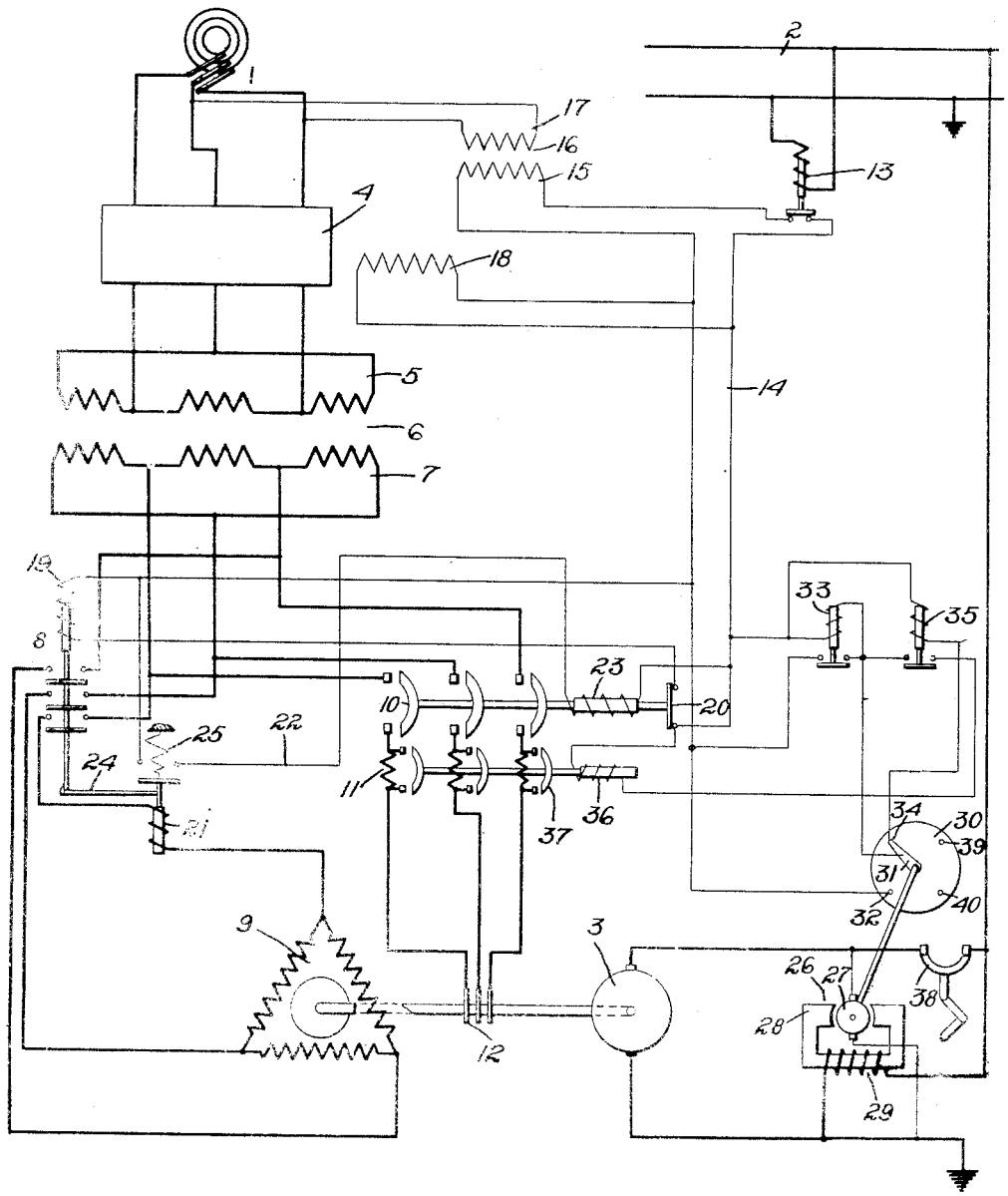
WITNESSES:
INVENTOR
Roy J. Wensley
BY
Wesley G. Carr
ATTORNEY Patented Jan. 16, 1923.

1,442,202

UNITED STATES PATENT OFFICE.

ROY J. WENSLEY, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

Application filed March 14, 1918. Serial No. 222,435.

*To all whom it may concern:*

Be it known that I, ROY J. WENSLEY, a citizen of the United States, and a resident of Edgewood Park, in the county of Allegheny and State of Pennsylvania, have invented a new and useful Improvement in Electrical Systems, of which the following is a specification.

My invention relates to electrical systems and particularly to such systems in which a motor-started rotary converter is adapted to be automatically started and controlled for the purpose of supplying energy to the circuit under predetermined conditions.

One object of my invention is to provide a system, of the above-indicated character, that shall be readily applicable to existing types of motor-started rotary converters.

A further object of my invention is to provide a system, of the above-indicated character, that shall be simple and inexpensive to construct and effective in its operation.

In carrying out my invention, I provide means for energizing the starting motor of a motor-started rotary converter when the voltage on the system, that is to be supplied with energy from the converter, falls below a predetermined value. Means is provided, that is dependent upon the current traversing the starting motor after it has once started, for connecting the converter, through current-limiting devices, to the alternating-current circuit, and a polarized relay is adapted to short circuit the current-limiting devices when the direct-current end of the converter is of such polarity that it may be connected to the direct-current circuit.

The single figure of the accompanying drawing is a diagrammatic view of an electrical system embodying my invention.

An electrical system in which my invention is embodied comprises an alternating-current circuit 1, a direct-current circuit 2 and a rotary or synchronous converter 3 connected therebetween. It is frequently desirable to cause the converter 3 to be started and stopped in accordance with predetermined load and voltage conditions in the direct-current circuit 2. If the converter 3 is located a relatively great distance from the source of alternating current, it is desirable that the starting and stopping of the converter shall be accomplished by automatic means, and, in so doing, the cost of operating the substations will be relatively small. That is, if the converter 3 can be caused to operate only when a predetermined load is connected to the direct-current circuit, it will be understood that the only losses in the substation will occur when the rotary converter is supplying energy.

The conductors of the circuit 1 are operatively connected, through a circuit-interrupter 4, to the terminals of the primary winding 5 of a transformer 6, the secondary windings 7 of which are connected, through an automatically controlled switch 8, to the starting motor 9 of the converter 3. The secondary winding 7 of the transformer 6 is also connected, through a circuit-interrupter 10 and current-limiting devices 11, to the collector rings 12 of the converter 3.

A voltage-responsive relay 13 is operatively connected to the circuit 2 and is adapted, when the voltage on the circuit 2 drops below a predetermined value, to complete a circuit 14, comprising the secondary winding 15 of a transformer 16, the primary winding 17 of which is connected across the circuit 1. The closing coil 18 of the circuit-interrupter 4 is connected across the circuit 14 and is thus energized to close the circuit-interrupter 4 when the voltage on the circuit 2 drops below a predetermined value by reason of the circuit 2 becoming heavily loaded. The actuating winding 19 of the switch 8 is connected across the circuit 14 through a switch 20 that is controlled by the circuit-interrupter 10. That is, since the circuit-interrupter 10 is normally in its open position, the winding 19 will be energized as soon as the winding 18 is energized to thereby close the switch 8 which causes the motor 9 to start.

A current-limiting relay 21 is connected in one conductor of the motor 9 and is adapted to control a circuit 22 comprising the actuating winding 23 of the circuit-interrupter 10. The circuit 22 is so connected to the circuit 14 that, when the relay 21 operates, the circuit-interrupter 10 is closed. An interlocking device 24 is provided between the switch 8 and the relay 21 to prevent the operation of the relay 21 except when the switch 8 is closed to start the motor 9. However, when the current traversing the motor drops to a predetermined value to thereby indicate that the motor 9 has accelerated to substantially synchronous speed, the spring 25 of the relay 21 will cause the contact members of the relay 21 to complete the circuit 22 and thereby effect the closing of the circuit interrupter 10 by means of a self-locking relay 22ª. The closing of the interrupter 10 causes an alternating electromotive force of a relatively small value to be impressed on the converter 3. When the interrupter 10 closes, the switch 20 is opened to de-energize the winding 19 to disconnect the motor 9. The interrupter 10 may be held closed by any means well known in the electrical switch art.

A polarized relay 26, comprising an armature 27 that is connected across the direct-current brushes of the converter 3, a permanent magnet 28 and a field winding 29 that is connected across the circuit 2, is adapted to control the contact-making device 30. That is, when the converter 3 is started, if it pulls into step with the circuit 1 and the direct-current end is of the correct polarity, the movable member 31 of the contact device 30 will turn in one direction and, when it engages the stationary contact member 32, it causes a relay 33 to be energized. Further movement of the contact member 31 causes the same to engage the stationary contact member 34 to effect energization of a relay 35. When the relays 33 and 35 are energized, a circuit is completed from the circuit 14 through the actuating winding 36 of a circuit-interrupter 37 that is adapted to short circuit the current-limiting devices 11. The relay 33 is employed to connect the movable member 31 to the circuit 14 so that the actuation of the relay 35 may be effected when the member 31 engages the contact member 34. When the contact member engages the contact member 34, the two contact members remain in engagement to maintain the relay 35 energized whereby the interrupter 37 is held closed by the coil 36. Such engagement is maintained by reason of the de-energization of the polarity relay, by means not shown, after the interrupter 37 is closed. Thus, when the polarized relay 36 indicates that the direct-current end of converter 3 is of such polarity that it may be connected, through a circuit-interrupter 38, to the circuit 2, the current-limiting device 11 will be short circuited to permit full line current to traverse the converter 3. However, if the polarized relay 36 indicates incorrect polarity, the contact member 31 will turn in the opposite direction to engage contact members 39 and 40 that are adapted to control means (not shown) to reverse the field winding of the converter 3 and thereby cause the same to slip a pole and have the correct polarity. The field-reversing means is not shown because it would unnecessarily complicate the drawings and description and because it forms no part of this invention except in that it is necessary to form a complete automatic substation. Copending application, Serial No. 122,377, filed Sept. 27, 1916, by F. C. Hanker and C. M. Moss and assigned to the Westinghouse Electric & Mfg. Co. discloses a field-reversing arrangement of this type.

After the converter 3 is connected to the circuit 2, if the voltage on the circuit 2 rises above a predetermined value, the circuit 14 will be interrupted and the circuit-interrupter 4 will be opened to thereby disconnect the converter 3 from the alternating-current circuit. When the circuit 14 is opened, the circuit-interrupters 10 and 37 return to their initial positions to permit the motor 9 of the converter 3 to be restarted when the desired conditions obtain in the circuit 2.

My invention is not limited to the particular devices illustrated, as many modifications may be made therein without departing from the spirit and scope of the invention as set forth in the appended claims.

I claim as my invention:

1. In an electrical system, the combination with an alternating-current circuit, a direct-current circuit, a converter for operatively connecting the circuits together and a motor for starting the converter, of means for controlling the energization of the motor, means responsive to the current taken by the motor for controlling the application of a relatively small electromotive force to the converter and means dependent upon the polarity of the direct-current voltage of the converter for controlling the application of the normal electromotive force to the converter.

2. In an electrical system, the combination with an alternating-current circuit, a direct-current circuit, a converter for operatively connecting the circuits together and a motor for starting the converter, of means for controlling the energization of the motor, means responsive to the current traversing the motor, means for limiting the current that may traverse the converter to a safe starting value, and means controlled by the motor-current-responsive means for connecting the current-limiting means between the converter and the alternating-current circuit.

3. In an electrical system, the combination with an alternating-current circuit, a direct-current circuit, a converter for operatively connecting the circuits together and a motor for starting the converter, of means responsive to the voltage of the direct-current circuit for controlling the energization of the motor and means responsive to the current traversing the motor and the polarity of the converter for operatively connecting the converter to the alternating-current circuit.

4. In an electrical system, the combination with an alternating-current circuit, a direct-current circuit, a converter for operatively connecting the circuits together and a motor for starting the converter, of means responsive to the voltage of the direct-current circuit for controlling the energization of the motor, current-limiting devices, and means responsive to the drop in current traversing the motor for operatively connecting the converter through the current-limiting devices to the alternating-current circuit.

5. In an electrical system, the combination with an alternating-current circuit, a direct-current circuit, a rotary converter for operatively connecting the circuits together, and a motor for starting the converter, of means responsive to load conditions in the direct-current circuit for controlling the starting of the motor, current-limiting means, means responsive to a drop in current in the motor after it is started for controlling the connection of the converter through the current-limiting means to the alternating-current circuit, and means for short-circuiting the current-limiting means under predetermined polarity conditions in the converter.

6. In an electrical system, the combination with an alternating-current circuit, a direct-current circuit, a rotary converter for operatively connecting the circuits together, and a motor for starting the converter, of means responsive to load conditions in the direct-current circuit for controlling the starting of the motor, current-limiting means, means responsive to a drop in current in the motor after it is started for connecting the converter through the current-limiting means to the alternating-current circuit, and means comprising a polarized relay responsive to the polarity of the direct-current circuit and that of the direct-current end of the converter for causing the current-limiting means to be short circuited.

7. In an electrical system, the combination with an alternating-current circuit, a direct-current circuit, a rotary converter for operatively connecting the circuits together, and a motor for starting the converter, of means responsive to load conditions in the direct-current circuit for controlling the starting of the motor, current-limiting means, means responsive to a drop in current in the motor after it is started for connecting the converter through the current-limiting means to the alternating-current circuit, and means comprising a polarized relay responsive to the polarity of the direct-current end of the converter for causing the current-limiting means to be short circuited.

8. In an electrical system, the combination with an alternating-current circuit, a direct-current circuit, a rotary converter for operatively connecting the circuits together, and a motor for starting the converter, of means responsive to load conditions in the direct-current circuit for controlling the starting of the motor, and means dependent upon the drop in current traversing the motor to control the application of an electromotive force of limited value to the converter from the alternating-current circuit and to disconnect the motor from the energizing circuit.

9. In an electrical system, the combination with an alternating-current circuit, a direct-current circuit, a rotary converter for connecting the circuits together, and a motor for starting the converter, a current-limiting means, means responsive to a drop in current in the motor for connecting the converter through the current-limiting means to the alternating-current circuit, and means comprising a polarized relay responsive to the polarity of the direct-current circuit and that of the direct-current end of the converter for causing the current-limiting means to be short circuited.

10. In an electrical system, the combination with an alternating-current circuit, a direct-current circuit, a converter for operatively connecting the circuits together and a motor for starting the converter, of means responsive to a drop in the motor current for controlling the application of a relatively small value of electromotive force to the converter, and means for controlling the application of the normal electromotive force to the converter under predetermined conditions of polarity therein.

11. In an electrical system, the combination with an alternating-current circuit, a direct-current circuit, a converter for operatively connecting the circuits together and a motor for starting the converter, of means responsive to the current traversing the motor for controlling the application of a reduced voltage to the converter and means responsive to the polarity of the converter for controlling the application of the normal voltage thereto.

12. In an electrical system, the combination with an alternating-current circuit, a direct-current circuit, a converter for operatively connecting the circuits together and a motor for starting the converter, of means responsive to a predetermined value of current traversing the motor for effecting the connection of the converter to the alternating-current circuit and means for limiting the current that may traverse the converter to a safe starting value until a predetermined polarity is developed in the converter.

13. In an electrical system, the combination with an alternating-current circuit, a direct-current circuit, a converter for operatively connecting the circuits together and a motor for starting the converter, of means responsive to a predetermined value of current traversing the motor for effecting the connection of the converter to the alternating-current circuit, means for limiting the current that may traverse the converter to a safe starting value and means responsive to the polarity of the direct-current end of the converter for rendering the current-limiting means ineffective.

14. The method of starting a motor-started synchronous converter which consists in starting the motor and thereby accelerating the converter to substantially synchronous speed, connecting the converter to the alternating-current circuit through current-limiting reactors and then close-circuiting the reactors in accordance with the polarity of the direct-current end of the converter.

15. The method of starting a motor-started synchronous converter which consists in starting the motor and accelerating the motor and the converter to substantially synchronous speed, simultaneously de-energizing the motor and connecting the converter to the alternating-current circuit to permit a current of small value to traverse the converter and then to permit normal values of current to traverse the converter after a predetermined polarity has been effected in the converter.

16. The method of starting a motor-started synchronous converter which consists in starting the motor and accelerating the motor and the converter to substantially synchronous speed, simultaneously de-energizing the motor and connecting the converter to the alternating-current circuit through current-limiting reactors until a predetermined polarity is effected in the converter and then short-circuiting the reactors.

17. The method of starting a motor-started synchronous converter which consists in starting the motor and accelerating the motor and the converter to substantially synchronous speed, simultaneously de-energizing the motor and connecting the converter to the alternating-current circuit to permit a current of relatively small value to traverse the converter until a predetermined polarity is developed therein and then to permit normal values of current to traverse the converter.

In testimony whereof, I have hereunto subscribed my name this 12th day of March, 1918.

ROY J. WENSLEY.